(12) United States Patent
Jeddeloh

(10) Patent No.: US 6,460,114 B1
(45) Date of Patent: *Oct. 1, 2002

(54) STORING A FLUSHED CACHE LINE IN A MEMORY BUFFER OF A CONTROLLER

(75) Inventor: Joseph M. Jeddeloh, Minneapolis, MN (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/363,789

(22) Filed: Jul. 29, 1999

(51) Int. Cl.[7] ............................................. G06F 12/00
(52) U.S. Cl. ....................................... 711/120; 711/121
(58) Field of Search ................................ 711/119, 120, 711/121

(56) References Cited

U.S. PATENT DOCUMENTS

| | | | | |
|---|---|---|---|---|
| 5,261,066 A | * | 11/1993 | Jouppi et al. ............... | 711/122 |
| 5,524,220 A | | 6/1996 | Verma et al. ............... | 395/375 |
| 5,638,534 A | | 6/1997 | Mote, Jr. .................... | 395/485 |
| 5,778,422 A | * | 7/1998 | Genduso et al. ............ | 711/117 |
| 5,893,153 A | * | 4/1999 | Tzeng et al. ................ | 711/141 |
| 5,944,815 A | * | 8/1999 | Witt ............................ | 712/207 |
| 6,038,645 A | * | 3/2000 | Nanda et al. ................ | 711/133 |
| 6,078,992 A | * | 6/2000 | Hum ........................... | 711/120 |
| 6,154,816 A | * | 11/2000 | Steely et al. ................ | 711/121 |
| 6,195,729 B1 | * | 2/2001 | Arimilli et al. ............. | 711/119 |
| 6,199,142 B1 | * | 3/2001 | Saulsbury et al. .......... | 711/105 |
| 6,279,080 B1 | * | 8/2001 | DeRoo ........................ | 711/135 |

FOREIGN PATENT DOCUMENTS

| | | |
|---|---|---|
| EP | 0 470 736 A1 | 2/1992 |
| EP | 0 657 819 A2 | 6/1995 |
| EP | 0 681 241 A1 | 11/1995 |
| EP | 0 800 137 A1 | 10/1997 |
| GB | 2 215 887 A | 9/1989 |

OTHER PUBLICATIONS

Patterson, David A. and John L. Hennessy. Computer Architecture: A Quantitative Approach. Morgan Kaufman Publishers, Inc. 1996.*

* cited by examiner

*Primary Examiner*—Kevin Verbrugge
(74) *Attorney, Agent, or Firm*—Trop, Pruner & Hu, P.C.

(57) ABSTRACT

Methods and devices to reduce processor-to-system memory access latency through the use of a memory buffer for the storage of cache lines flushed (cast out) from conventional level-1 (L1) and/or level-2 (L2) processor caches are described. The memory buffer, referred to as a cast-out cache, may be incorporated within a system controller and/or memory controller device.

23 Claims, 5 Drawing Sheets

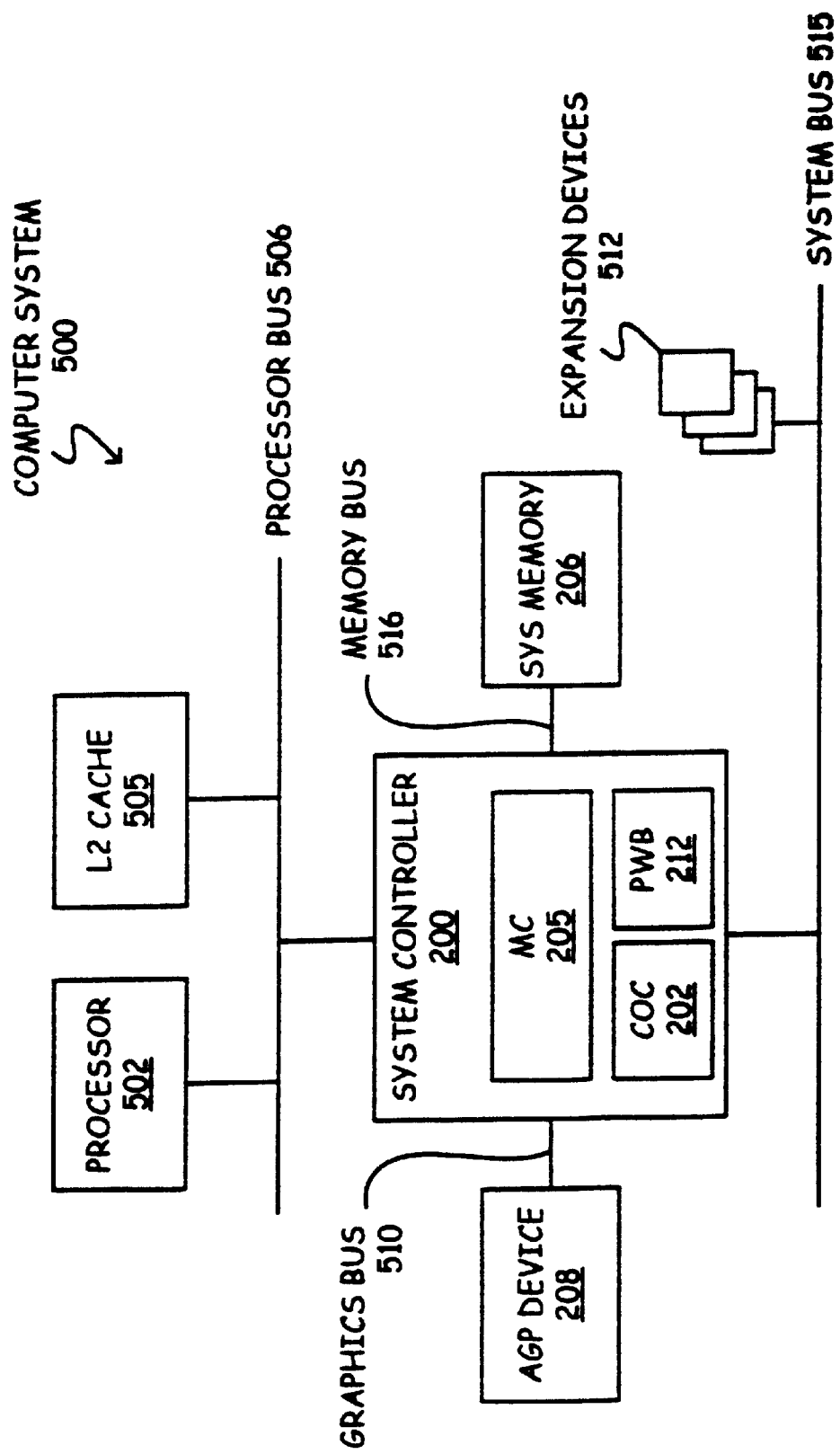

STORING A FLUSHED CACHE LINE IN A MEMORY BUFFER OF A CONTROLLER

BACKGROUND

The invention relates generally to computer memory systems and more particularly, but not by way of limitation, to a caching technique to improve host processor memory access operations.

In a typical computer system, program instructions and data are read from and written to system memory at random addresses. To combat this random nature of memory access operations level-1 (L1) and level-2 (L2) cache memories have been used to decrease the time, or number of clock cycles, a given processor must spend communicating with system memory during memory read and write operations.

Cache memories rely on the principle of access locality to improve the efficiency of processor-to-memory operations and, therefore, overall computer system performance. In particular, when a processor accesses system memory for program instructions and/or data, the information retrieved includes not only the targeted instructions and/or data, but additional bytes of information that surround the targeted memory location. The sum of the information retrieved and stored in the cache is known as a "cache line." (A typical cache line may comprise 32 bytes.) The principle of access locality predicts that the processor will very probably use the additional retrieved bytes subsequent to the use of the originally targeted program instructions. During such operations as the execution of program loops, for example, information in a single cache line may be used multiple times. Each processor initiated memory access that may be satisfied by information already in a cache (referred to as a "hit"), eliminates the need to access system memory and, therefore, improves the operational speed of the computer system. In contrast, if a processor initiated memory access can not be satisfied by information already in a cache (referred to as a "miss"), the processor must access system memory—causing a new cache line to be brought into the cache and, perhaps, the removal of an existing cache line.

Referring to FIG. 1, many modern computer systems 100 utilize processor units 102 that incorporate small L1 cache memory 104 (e.g., 32 kilobytes, KB) while also providing larger external L2 cache memory 106 (e.g., 256 KB to 612 KB). As shown, processor unit 102, L1 cache 104 and L2 cache 106 are coupled to system memory 108 via processor bus 110 and system controller 112. As part of processor unit 102 itself, L1 cache 104 provides the fastest possible access to stored cache line information. Because of its relatively small size however, cache miss operations may occur frequently. When a L1 cache miss occurs, L2 cache 106 is searched for the targeted program data and/or program instructions (hereinafter collectively referred to as data). If L2 cache 106 contains the targeted data, the appropriate cache line is transferred to L1 cache 104. If L2 cache 106 does not contain the targeted data, an access operation to system memory 108 (typically mediated by system controller 112) is initiated. The time between processor unit 102 initiating a search for target data and the time that data is acquired or received by the processor unit (from L1 cache 104, L2 cache 106 or memory 108) is known as read latency. A key function of caches 104 and 106 is to reduce the processor unit 102's read latency.

If L1 cache 104 is full when a new cache line is brought in for storage, a selected cache line is removed (often referred to as flushed). If the selected cache line has not been modified since being loaded into L1 cache 104 (i.e., the selected cache line is "clean"), it may be replaced immediately by the new cache line. If the selected cache line has been modified since being placed into L1 cache 104 (i.e., the selected cache line is "dirty"), it may be flushed to L2 cache 106. If L2 cache 106 is full when a L1 cache line is brought in for storage, one of its cache lines is selected for replacement. As with L1 cache 104, if the selected cache line is clean it may be replaced immediately. If the selected cache line is dirty, however, it may be flushed to posted write buffer 114 in system controller 112. The purpose of posted write buffer 114 is to provide short-term storage of dirty cache lines that are in the process of being written to system memory 108. (Posted write buffers 114 are typically only large enough to store a few, e.g., 8, cache lines.)

While reasonably large by historical standards, the size of both L1 cache 104 and L2 cache 106 are small relative to the amounts of data accessed by modern software applications. Because of this, computer systems employing conventional L1 and L2 caches (especially those designed for multitasking operations) may exhibit unacceptably high cache miss rates. One effect of high cache miss rates is to increase the latency time of processor unit read operations. Thus, it would be beneficial to provide a mechanism to reduce the memory latency time experienced by host processor units.

SUMMARY

In one embodiment the invention provides a computer system comprising a processor, a level-1 cache (operatively coupled to the processor), a level-2 cache (operatively coupled to the processor), a system memory, and a system controller (operatively coupled to the processor, level-1 cache, level-2 cache and system memory), wherein the system controller has a memory buffer adapted to store cache lines flushed (cast out) from one or more processor caches. The memory buffer, referred to herein as a cast-out cache, may be configured as a set associative or fully associative memory and may comprise dynamic or static random access memory integrated into the system controller.

In another embodiment, the invention provides a method to control memory access transactions. The method includes receiving a memory access request signal from a device, identifying the device, selecting a cache structure based on the identified device, using the selected cache structure to satisfy the memory access request. The acts of selecting a cache structure and using the selected cache structure may comprise selecting a cache structure if the identified device is a processor unit, otherwise accessing a system memory to satisfy the memory request. Methods in accordance with the invention may be stored in any media that is readable and executable by a computer system.

BRIEF DESCRIPTION OF THE DRAWINGS

FIG. 5 shows a block diagram of a computer system having a cast-out cache in accordance with one embodiment of the invention.

DETAILED DESCRIPTION

Techniques (including methods and devices) to reduce processor-to system memory access latency through the use of a memory buffer for the storage of cache lines flushed from conventional level-1 (L1) and/or level-2 (L2) caches are described. The following embodiments of the invention, described in terms of a memory buffer incorporated within a system controller device, are illustrative only and are not to be considered limiting in any respect.

Figure 1:
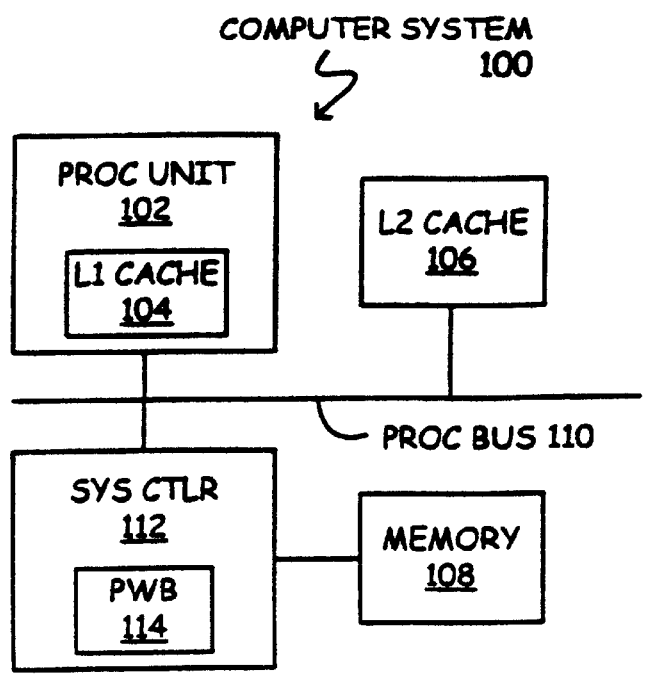
FIG. 1 shows a block diagram of a prior art computer system having a memory architecture incorporating level-1 and level-2 cache memories.
Figure 2:
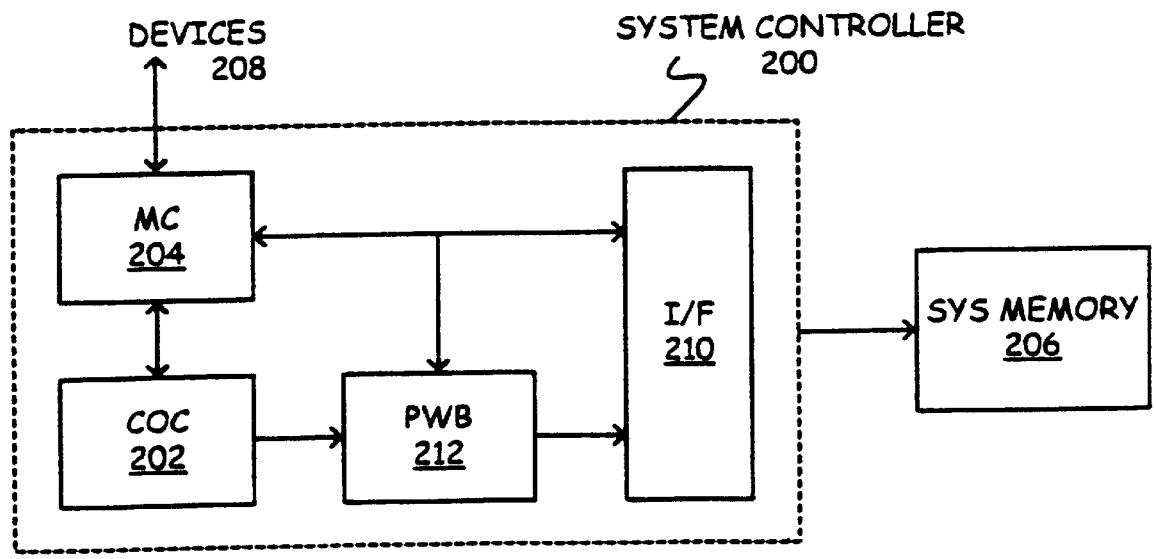
FIG. 2 shows a block diagram of a system controller that incorporates a cast-out cache in accordance with one embodiment of the invention.

Referring to FIG. 2, system controller 200 in accordance with one embodiment of the invention incorporates a memory buffer for the storage of cache lines flushed—cast out—from a processor's L1 and/or L2 caches (hereinafter referred to as cast-out cache 202). Memory controller 204 mediates data transfers (wherein "data" includes program data and program instructions) between system memory 206 and devices 208 via memory interface 210, posted write buffer 212 and cast-out cache 202. In accordance with the invention, as a cache line is flushed from a processor's cache(s) it is stored in cast-out cache 202 rather than posted write buffer 212 as in conventional computer systems. Subsequent reads to cache lines stored in cast-out cache may be returned to the processor without incurring the latency associated with a full memory access. Illustrative devices 208 include processor units, L1 cache units, L2 cache units, graphics devices, and peripheral or input-output (I/O) devices.

Figure 3:
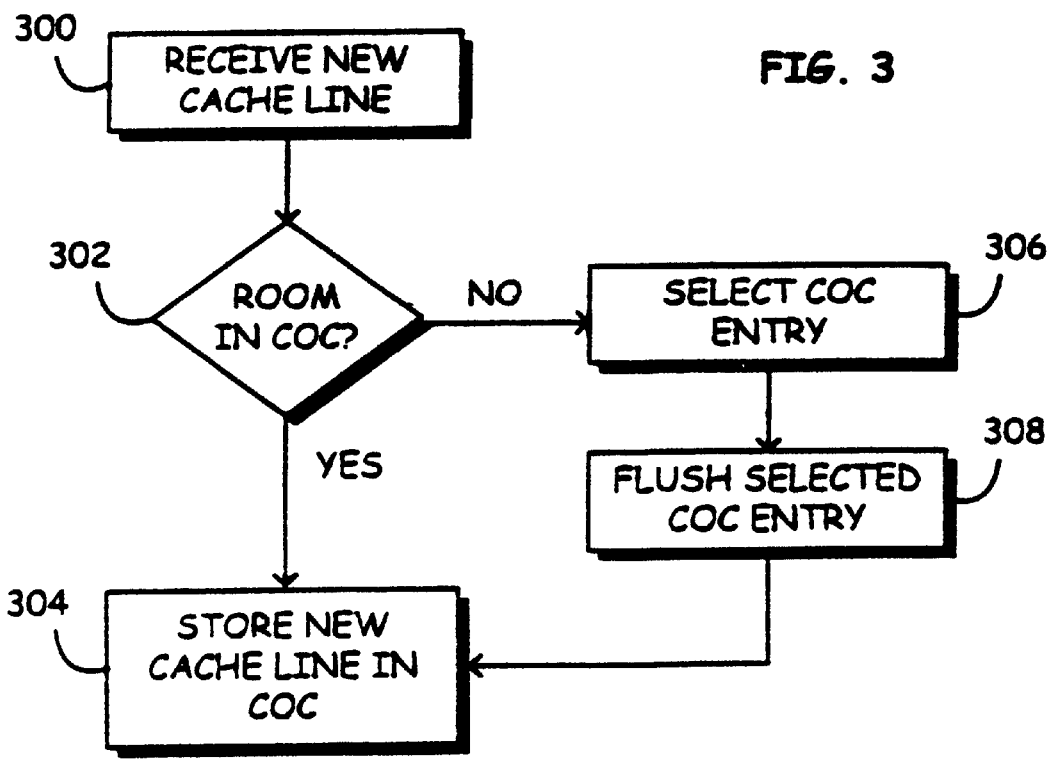
FIG. 3 shows a flow diagram format of how a memory controller processes a new cast-out cache entry in accordance with one embodiment of the invention.

FIG. 3 shows, in flow diagram format, how memory controller 204 processes a new cast-out cache entry in accordance with one embodiment of the invention. On receiving a cache line (block 300), system controller 200 determines if cast-out cache 202 has sufficient room to accept the new entry. If cast-out cache 202 does have sufficient room (the "yes" prong of diamond 302), the newly received cache line is stored (block 304) in cast-out cache 202. Each cache line stored in cast-out cache 202 comprises a data component and a tag component, where the tag component further includes a status portion and an address portion. The status portion includes indication of an entries state (e.g., dirty or clean). The address portion includes an indication of the data component's address in memory 206. As would be known to those of ordinary skill, the address portion may be used to organize cast-out cache 202 into a set associative memory (e.g., 2-way, 4-way, and 8-way) or a fully associative memory.

If cast-out cache 202 does not have sufficient room (the "no" prong of diamond 302), a cast-out cache entry is selected (block 306) and flushed to posted write buffer 212 (block 308). Once the selected entry is flushed, the new cache line may be stored (block 304). Memory controller 204 may utilize posted write buffer 212 in a conventional manner; as a temporary staging area for data being written to system memory 206. For example, if cast-out cache 202 is full, the selected cast-out cache entry may be flushed to posted write buffer 212. Any desired cache line replacement algorithm may be employed. In one embodiment, for example, a least recently used (LRU) algorithm may be used to select that cast-out cache entry for removal (block 306). In another embodiment, clean cache lines are selected before dirty cache lines so as to avoid, or postpone, memory write operations. In yet another embodiment, these two techniques may be combined.

Figure 4:
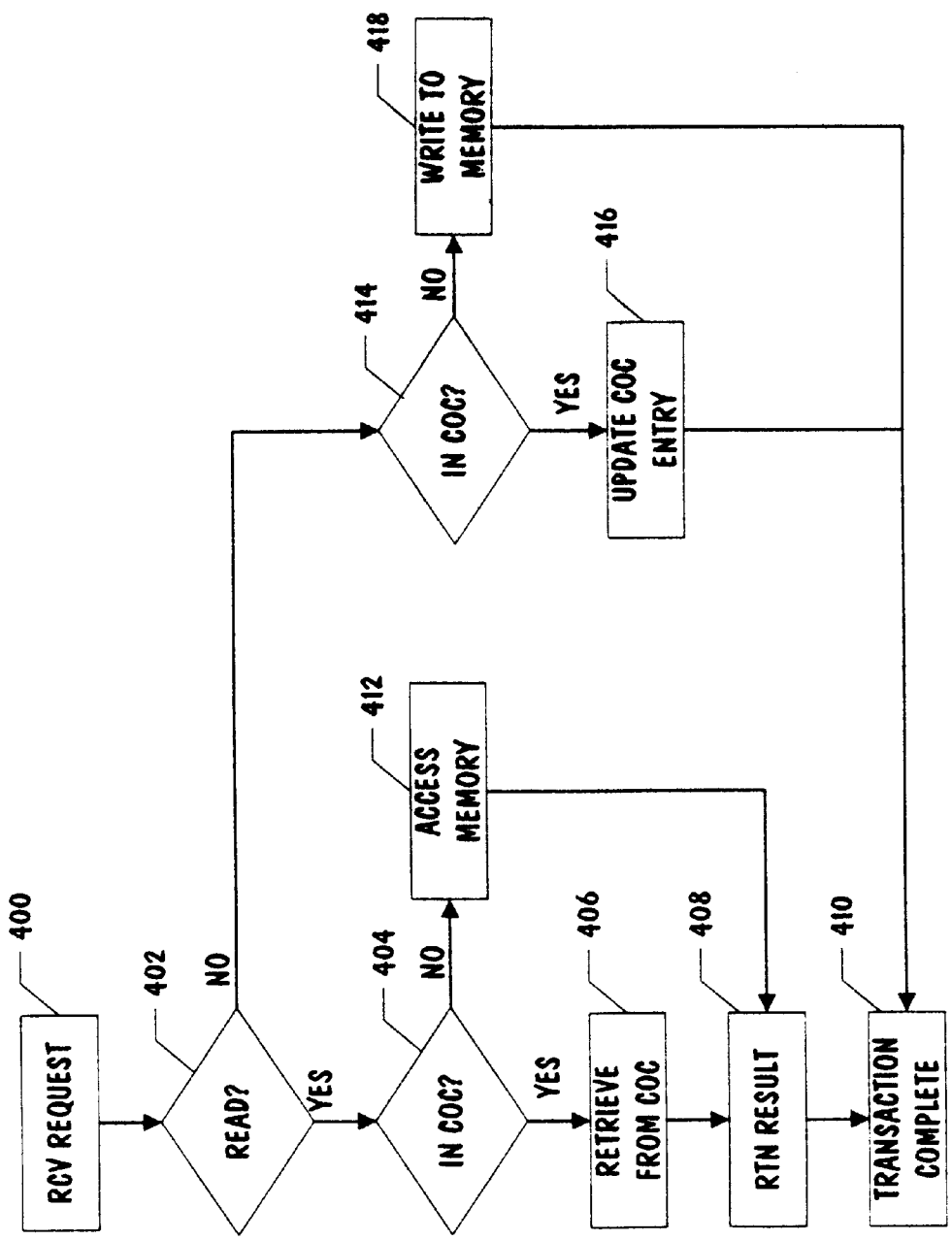
FIG. 4 shows a flow diagram of how a memory controller processes a memory access request using a cast-out cache in accordance with one embodiment of the invention.

FIG. 4 shows, in flow diagram format, how memory controller 204 processes a memory access request using cast-out cache 202 in accordance with one embodiment of the invention. After receiving a memory transaction request (block 400), memory controller 204 determines what type of request it is to process. If the received request is a memory read request (the "yes" prong of diamond 402), a check is made to determine if the requested data is in castout cache 202. If the requested data is in cast-out cache 202 (the "yes" prong of diamond 404), the requested data is retrieved from cast-out cache 202 (block 406) and returned to the requesting device (block 408) at which point the transaction is complete (block 410). If the requested data is not available in cast-out cache 202 (the "no" prong of diamond 404), the requested data is retrieved from system memory 206 (block 412) and returned to the requesting device (block 408). In one embodiment, cast-out cache 202 is populated with cache lines flushed (cast out) from processor caches only. In this embodiment, only processor unit reads are processed in accordance with FIG. 4 (acts 400 through 412).

If the received memory transaction request is a memory write request (the "no" prong of diamond 402), a test is made to determine if the targeted write address has an entry in cast-out cache 202 (diamond 414). If the targeted address has an associated cast-out cache entry (the "yes" prong of diamond 414), the entry is updated in accordance with the write request (block 416). If the targeted address does not have an associated cast-out cache entry (the "no" prong of diamond 414), a memory write operation is performed (block 418). In one embodiment cast-out cache 202 may be updated during memory write operations in accordance with FIG. 4 when either a processor unit or an input-output (I/O) bus master device writes to memory 206. In this sense, memory controller 204 "snoops" cast-out cache 202 during memory write operations. Devices other than processor units, however, do not generate cache line allocation actions during memory read operations (only cache lines cast out or flushed from processor caches are loaded into cast-out cache 202).

Referring to FIG. 5, computer system 500 in accordance with one embodiment of the invention includes processor unit 502 (incorporating an L1 cache structure, not shown) and L2 cache unit 504 coupled to system controller 200 via processor bus 506. System controller 200 couples accelerated graphics device 508 (via graphics bus 510) and expansion or I/O devices 512 (via system bus 514) to system memory 206 (via memory bus 516). Illustrative processor units (e.g., 502) include the PENTIUM® family of processors and the 80×86 families of processors from Intel Corporation. Illustrative expansion devices 512 include any device designed to operate in concert with system bus 514. For example, if system bus 514 operates in conformance with the peripheral component interconnect (PCI) standard, expansion devices 512 may be any PCI device (e.g., a network interface card). It will be recognized that additional bus structures and devices may be coupled to computer system 500. For example, if system bus 514 operates in accordance with the PCI standard, a PCI-to ISA bridge circuit may be used to couple one or more industry standard architecture (ISA) devices to computer system 500 (e.g., a keyboard controller and non-volatile memory). One illustrative PCI-to-ISA bridge circuit is the 82371AB PCI-to-ISA/IDE controller made by Intel Corporation.

Every memory access request satisfied from the contents of cast-out cache 202, allows memory controller 204 to reduce the memory transaction latency suffered by the requesting device (e.g., processor 502) by avoiding a system memory access operation. In addition, requests satisfied from cast-out cache 202 reduce memory bus 516 loading. The former benefit may be enhanced by making cast-out cache 202 relatively large, 1 to 4 megabytes for example. The latter benefit may further allow memory controller 204 to service multiple memory transaction requests (each associated with a different device) in parallel—one from cast-out cache 202 and another from system memory 206.

Figure 6:
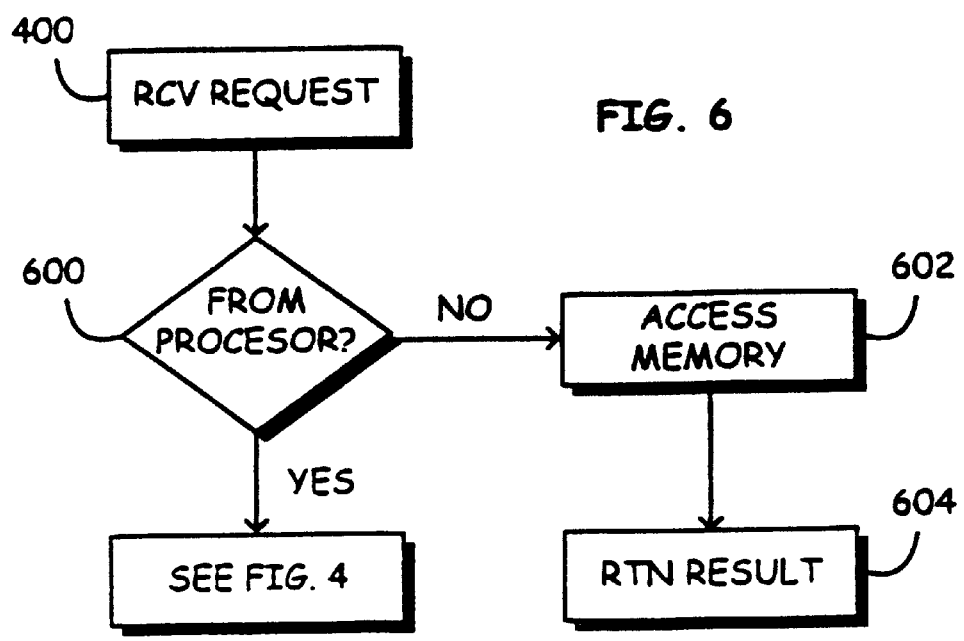
FIG. 6 shows a modification to FIG. 4 wherein a cast-out cache is used only for transactions associated with a processor unit.

While memory controller 204 may utilize cast-out cache 202 to service a memory request from any device (i.e., devices 208), in one embodiment only those transactions associated with a processor unit (e.g., 502) actually utilize cast-out cache 202. Referring to FIG. 6, for example, the flow diagram of FIG. 3 may be modified so that memory controller 204 determines what type of device issued the request. If the requesting device is a processor unit (the "yes" prong of diamond 600), acts in accordance with FIG. 3 are performed. If, on the other hand, the requesting device is not a processor unit (the "no" prong of diamond 600), a system memory access operation is performed (block 602) and the results returned to the requesting device in a conventional manner (block 604).

Figure 7:
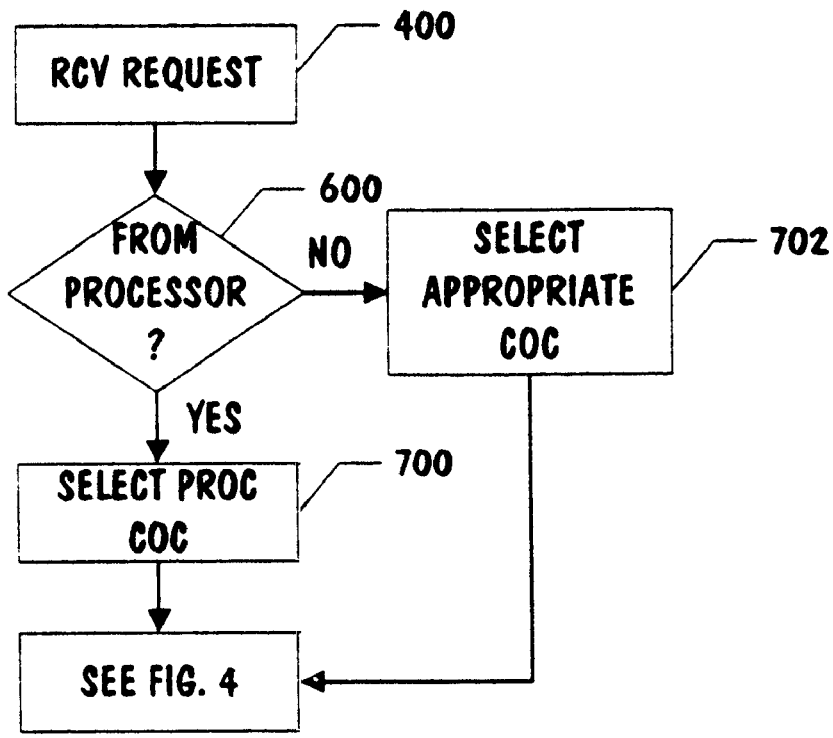
FIG. 7 shows another modification to FIG. 4 wherein a memory controller may access two or more cast-out cache structures.

In another embodiment of the invention, separate cast-out cache structures may be provided for processor units and I/O devices. Referring to FIG. 7, for example, the flow diagrams of FIGS. 4 and 6 may be modified to account for multiple cast-out cache structures. Following receipt of a memory access request (block 400), a series of tests are performed to determine what device issued the request. If the requesting device is a processor unit (the "yes" prong of 600), the processor cast-out cache is selected (block 700) and processing continues as outlined in FIG. 4. If, on the other hand, the requesting device is not a processor unit (the "no" prong of diamond 600), the appropriate cast-out cache structure is selected (block 702) where after processing continues as outlined in FIG. 4. As indicated, there may be two or more cast-out cache structures. In one embodiment, there is a cast-out cache structure for a processor unit and another cast-out cache structure for I/O devices (e.g., devices 512 coupled to system bus 514).

Various changes in the materials, components, circuit elements, as well as in the details of the illustrated operational methods are possible without departing from the scope of the claims. For instance, cast-out cache 202 may incorporate additional buffer memory to serve as temporary storage for cache lines moving in and out of the cache. One such buffer storage may act as a posted-write buffer for entries associated with the cast-out cache. In addition, while cast-out cache 202 and memory controller 204 have been shown as incorporated within system controller 200, it is possible to embody them in a device external to system controller 200. In one embodiment cast-out cache 202 may be a large dynamic random access memory (DRAM) array and memory controller 204 may be a programmable control device integrated, as shown, into system controller 200. In another embodiment, cast-out cache 202 and memory controller 204 may be implemented external to system controller 200 and coupled directly to system bus 514.

As a programmable control device, memory controller 204 may be a single computer processor, a plurality of computer processors coupled by a communications link, or a custom designed state machine. Custom designed state machines may be embodied in a hardware device such as a printed circuit board comprising discrete logic, integrated circuits, or specially designed application specific integrated circuits (ASICs). In addition, acts in accordance with FIGS. 4 through 7 may be performed by a programmable control device executing instructions organized into a program module and stored in a storage device. Storage devices suitable for tangibly embodying program instructions include all forms of non-volatile memory including, but not limited to: semiconductor memory devices such as electrically programmable read only memory (EPROM), electrically erasable programmable read only memory (EEPROM), and flash devices.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A memory control method executed by a memory control device having one or more cache structures, the method comprising:

receiving a memory access request from a device;

identifying the device;

selecting a cache structure based on the identified device; and using the selected cache structure to satisfy the memory access request, wherein the act of selecting a cache structure comprises:

selecting a first cache structure if the identified device is a processor unit, else selecting a second cache structure.

2. The method of claim 1, further comprising flushing data to be replaced from a cache memory to one of the first and second cache structures.

3. The method of claim 2, further comprising accessing the first cache structure to retrieve data in response to a memory read request from the processor unit.

4. The method of claim 3, further comprising writing data to the first cache structure in response to a memory write request from the processor unit.

5. The method of claim 4, further comprising flushing data from the first cache structure if the first cache structure is full.

6. The method of claim 4, further comprising accessing the second cache structure to retrieve data in response to a memory read request from an I/O device.

7. The method of claim 6, further comprising writing data to the second cache structure in response to a memory write request from the I/O device.

8. The method of claim 7, further comprising flushing data from the second cache structure if the second cache structure is full.

9. A system comprising:

a processor;

a cache;

system memory;

a system controller having a memory buffer adapted to store data associated with processor initiated transactions to system memory, the system controller adapted to further:

store a cache line flushed from the cache into the memory buffer, receive a memory read request and, in response, access the memory buffer to determine if the memory buffer contains data for the memory read request, receive a memory write request and, in response, write data of the memory write request into the memory buffer;

a posted write buffer, the system controller adapted to flush an entry to be replaced from the memory buffer to the posted write buffer if the memory buffer is full;

a device; and a second memory buffer, the system controller adapted to select one of the memory buffers based on whether a data transaction is associated with the processor or the device.

10. The system of claim 9, wherein the memory buffer comprises a set-associative cache memory.

11. The system of claim 9, wherein the memory buffer comprises a fully associative cache memory.

12. The system of claim 9, wherein the system controller comprises an application specific integrated circuit.

13. The system of claim 9, further comprising:

a peripheral component interconnect bus coupled to the system controller; and one or more devices coupled to the peripheral component interconnect.

14. The system of claim 9, wherein the system controller is adapted to receive the flushed cache line from a cache memory.

15. The system of claim 14, wherein the system controller is adapted to check if the memory buffer has room to store the flushed cache line and to store the flushed cache line into the memory buffer if so.

16. The system of claim 15, wherein the system controller is adapted to select an entry of the memory buffer to flush to the posted write buffer if the memory buffer is full.

17. The system of claim 9, wherein the memory buffer is organized as a cache memory.

18. The system of claim 9, wherein the system controller is adapted to:

store a cache line flushed from the cache into the second memory buffer if the data transaction is associated with the device, receive a second memory read request from the device and, in response, access the second memory buffer to determine if the second memory buffer contains data for the second memory read request from the device; and receive a second memory write request from the device and, in response, write data of the second memory write request into the second memory buffer.

19. A controller comprising:

a first cache structure;

a second cache structure;

an interface to receive a memory access request from a device; and a unit adapted to select one of the first and second cache structures based on whether the device is a processor or an I/O device.

20. The controller of claim 19, wherein the unit is adapted to store data flushed from a cache memory into the first and second cache structures.

21. The controller of claim 20, wherein the unit is adapted to read data from one of the first and second cache structures in response to a memory read request.

22. The controller of claim 21, wherein the unit is adapted to write data into one of the first and second cache structures in response to a memory write request.

23. The controller of claim 22, further comprising a posted write buffer to store replacement data flushed from one of the first and second cache structures.

* * * * *